(12) United States Patent
Ma

(10) Patent No.: US 11,989,798 B2
(45) Date of Patent: May 21, 2024

(54) SYSTEM AND METHOD FOR PROCESSING VIDEO

(71) Applicant: Realtek Semiconductor Corporation, Hsinchu (TW)

(72) Inventor: Ji Ma, Jiangsu Province (CN)

(73) Assignee: Realtek Semiconductor Corporation, Hsinchu (TW)

( * ) Notice: Subject to any disclaimer, the term of this patent is extended or adjusted under 35 U.S.C. 154(b) by 91 days.

(21) Appl. No.: 17/662,078

(22) Filed: May 5, 2022

(65) Prior Publication Data

US 2023/0065053 A1 Mar. 2, 2023

(30) Foreign Application Priority Data

Aug. 30, 2021 (CN) .......................... 202111002006.9

(51) Int. Cl.
*G06T 1/20* (2006.01)
*G06T 1/60* (2006.01)
*G06T 9/00* (2006.01)

(52) U.S. Cl.
CPC .................. *G06T 1/20* (2013.01); *G06T 1/60* (2013.01); *G06T 9/00* (2013.01)

(58) Field of Classification Search
CPC ............... G06T 1/20; G06T 1/60; G06T 9/00
See application file for complete search history.

(56) References Cited

U.S. PATENT DOCUMENTS

| 2017/0048581 | A1* | 2/2017 | Kim | ................. H04N 21/44213 |
| 2020/0389669 | A1* | 12/2020 | Lucas | ........................ G06T 7/80 |
| 2021/0283499 | A1* | 9/2021 | Li | ............................ A63F 13/42 |

FOREIGN PATENT DOCUMENTS

| CN | 109168085 A | 1/2019 |
| TW | 201918070 A | 5/2019 |

* cited by examiner

*Primary Examiner* — Michelle Chin
(74) *Attorney, Agent, or Firm* — CKC & Partners Co., LLC

(57) ABSTRACT

A video processing system includes a system processor circuit and a video processor circuit. The system processor circuit includes a graphic buffer and an open media acceleration layer. The graphic buffer is configured to store video data from a camera. The open media acceleration interface is configured to extract at least one data parameter associated with the video data. The video processor circuit is configured to receive the at least one data parameter, receive the video data from the graphic buffer according to the at least one data parameter, encode the video data according to the at least one data parameter to generate encoded data, and transmit the encoded data to the system processor circuit.

18 Claims, 2 Drawing Sheets

SYSTEM AND METHOD FOR PROCESSING VIDEO

RELATED APPLICATIONS

This application claims priority to Chinese Application Serial Number 202111002006.9, filed Aug. 30, 2021, which is herein incorporated by reference.

BACKGROUND

Technical Field

The present disclosure relates to a video processing system and a video processing method. More particularly, the present disclosure relates to a video processing system and a video processing method which can reduce workload of a system processor circuit.

Description of Related Art

With developments of technology, more and more electronic devices support functions of taking a picture or recoding video. Taking the function of recoding video as an example, in current approaches, when the resolution of video data is higher, the workload of the system processor in these electronic devices is greater. This causes the operating system run by the system processor to operate slowly, or even to crash.

SUMMARY

Some aspects of the present disclosure are to provide a video processing system. The video processing system includes a system processor circuit and a video processor circuit. The system processor circuit includes a graphic buffer and an open media acceleration layer. The graphic buffer is configured to store video data from a camera. The open media acceleration layer is configured to extract at least one data parameter associated with the video data. The video processor circuit is configured to receive the at least one data parameter, receive the video data from the graphic buffer according to the at least one data parameter, encode the video data according to the at least one data parameter to generate encoded data, and transmit the encoded data to the system processor circuit.

Some aspects of the present disclosure are to provide a video processing method. The video processing method includes following operations: storing, by a graphic buffer in a system processor circuit, video data from a camera; extracting, by an open media acceleration layer in the system processor circuit, at least one data parameter associated with the video data; receiving, by a video processor circuit, the at least one data parameter; receiving, by the video processor circuit, the video data from the graphic buffer according to the at least one data parameter; encoding, by the video processor circuit, the video data according to the at least one data parameter to generate encoded data; and transmitting, by the video processor circuit, the encoded data to the system processor circuit.

As described above, in the present disclosure, the system processor circuit can extract the data parameter associated with the video data and transmit the data parameter to the video processor circuit. Then, the video processor circuit can receive the video data from the graphic buffer according to the data parameter. Accordingly, the system processor circuit does not need to duplicate the video data many times, so the workload of the system processor circuit can be reduced and the operating system run by the system processor circuit can operate smoothly.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
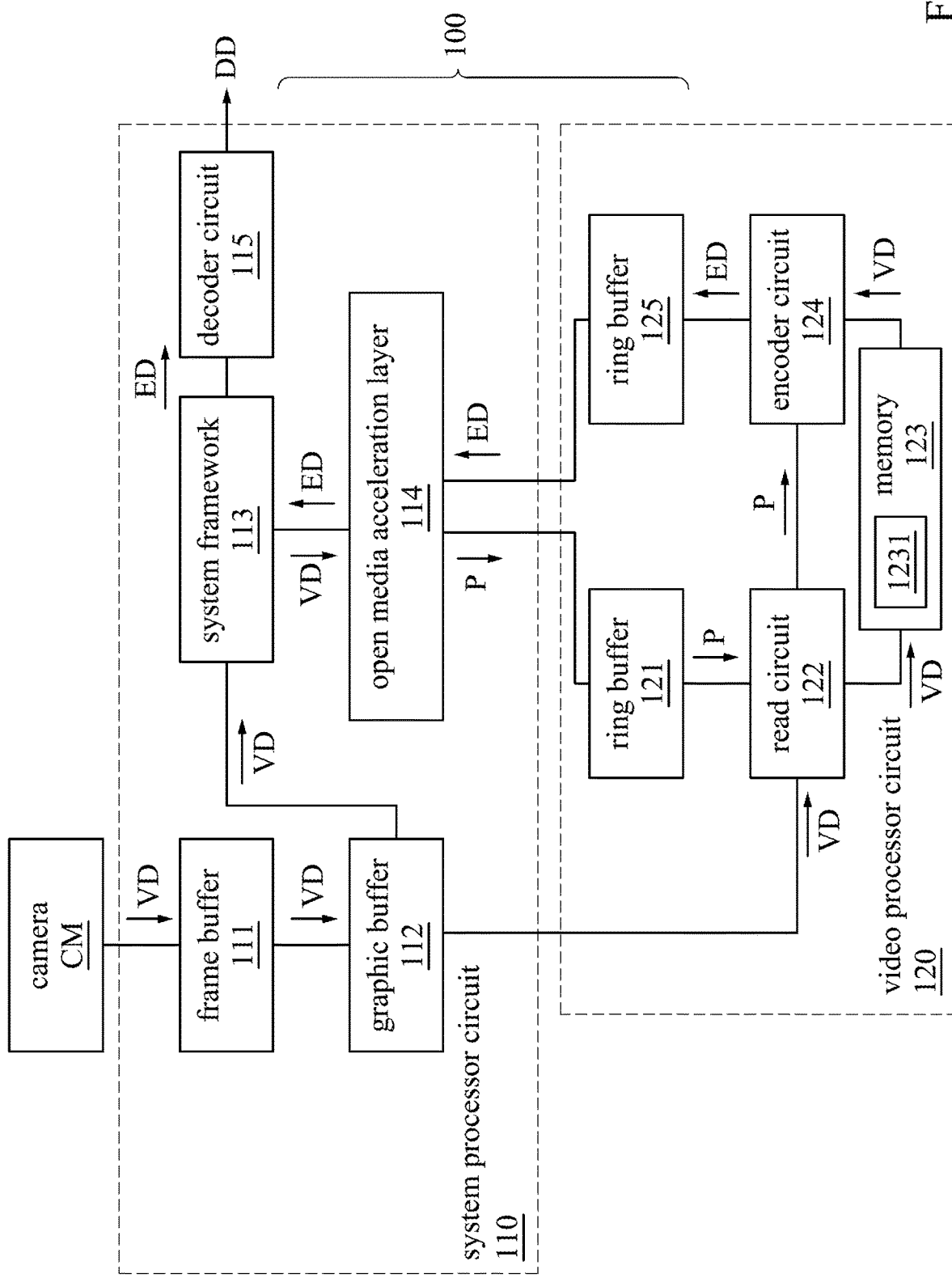
FIG. 1 is a schematic diagram of a video processing system according to some embodiments of the present disclosure.

Reference is made to FIG. 1. FIG. 1 is a schematic diagram of a video processing system 100 according to some embodiments of the present disclosure.

As illustrated in FIG. 1, the video processing system 100 includes a system processor circuit 110 and a video processor circuit 120. The system processor circuit 110 is coupled to the video processor circuit 120 and a camera CM.

The video processing system 100 can be disposed on a system on chip (SoC) in an electronic device. In some embodiments, when the aforementioned electronic device is a smart TV, the camera CM can be disposed outside the SoC of the smart TV. In some other embodiments, when the aforementioned electronic device is a smart phone, the camera CM can be integrated with the video processing system 100 and they can be disposed inside the smart phone.

The camera CM can be configured for taking a picture or recoding video. Following paragraphs take the function of recoding video as an example.

The system processor circuit 110 mainly runs applications related to the operating system of the electronic device. For example, when the electronic device supports an Android operating system, the system processor circuit 110 can run applications related to the Android operating system. The video processor circuit 120 mainly processes video data VD from the camera CM. For example, when the camera CM records video, the camera CM generates the video data VD. The video processor circuit 120 can encode the video data VD from the camera CM and transmit the encoded data back to the system processor circuit 110.

As illustrated in FIG. 1, the system processor circuit 110 includes a frame buffer 111, a graphic buffer 112, a system framework 113, an open media acceleration (OpenMax) layer 114, and a decoder circuit 115. In some embodiments, the system framework 113 and the open media acceleration layer 114 are implemented by software and are stored in storage elements of the system processor circuit 110.

The frame buffer 111 is coupled to the camera CM and the graphic buffer 112. The graphic buffer 112 is coupled to the system framework 113. The open media acceleration layer 114 is coupled between the system framework 113 and the video processor circuit 120. The system framework 113 is further coupled to the decoder circuit 115.

As illustrated in FIG. 1, the video processor circuit 120 includes a ring buffer 121, a read circuit 122, a memory 123, an encoder circuit 124, and a ring buffer 125.

The ring buffer 121 is coupled to the open media acceleration layer 114 and the read circuit 122. The read circuit 122 is coupled to the memory 123 and the encoder circuit 124. The encoder circuit 124 is coupled to the memory 123 and the ring buffer 125. The ring buffer 125 is coupled to the open media acceleration layer 114.

Following paragraphs take the video processing system 100 disposed in a smart TV with the Android operating system as an example, but the present disclosure is not limited thereto.

When the camera CM records video, the camera CM generates the original video data VD. The video data VD is transmitted to the frame buffer 111. For example, the video data VD is stored in the frame buffer 111 frame by frame. Then, the video data VD can be converted into and stored in the graphic buffer 112 via an application interface (e.g., CameraHal). This application interface can be implemented by software. For example, the video data VD is stored in the graphic buffer 112 according to a standard of the operating system (e.g., the Android operating system). In some embodiments, the graphic buffer 112 can be disposed in a dynamic random-access memory (DRAM) in the system processor circuit 110.

The video data VD can be transmitted to the open media acceleration layer 114 via the system framework 113. The open media acceleration layer 114 can extract at least one data parameter P associate with the video data VD. Then, the open media acceleration layer 114 can transmit the data parameter P to the video processor circuit 120. In some embodiments, the data parameter P includes at least one of a physical address of the video data VD in the graphic buffer 112, a data size of the video data VD, and an encoding format of the video data VD. The data size is, for example, a data length. The encoding format is, for example, YUV or RGB. In some embodiments, the aforementioned physical address, the aforementioned data size, and the aforementioned encoding format can be integrated into one data structure unit, and this data structure unit can be transmitted to the video processor circuit 120.

The video processor circuit 120 can receive the data parameter P from the system processor circuit 110, and receive the video data VD from the graphic buffer 112 according to the data parameter P. To be more specific, the ring buffer 121 can receive the data parameter P from the open media acceleration layer 114, and transmit the data parameter P to the read circuit 122. The read circuit 122 can receive the data parameter P, and request a video processing buffer 1231 from the memory 123 according to the data parameter P. In addition, the read circuit 122 can read the video data VD stored in the graphic buffer 112 according to the data parameter P. For example, the read circuit 122 can determine the address of the video data VD in the graphic buffer 112 according to the physical address carried in the data parameter P, and can determine data amount of the video data VD according to the data size carried in the data parameter P. Accordingly, the read circuit 122 can read out the video data VD from the graphic buffer 112 according to the aforementioned physical address and the aforementioned data size. Then, the read circuit 122 can store the video data VD into the video processing buffer 1231. The capacity of the video processing buffer 1231 can be determined according to the data amount of the video data VD read out from the graphic buffer 112.

The encoder circuit 124 can receive the data parameter P from the read circuit 122 and receive the video data VD from the video processing buffer 1231. As described above, the data parameter P can further include the encoding format of the video data VD. In other words, the encoder circuit 124 can encode the video data VD according to the encoding format (e.g., YUV or RGB) in the data parameter P to generate encoded data ED.

Then, the open media acceleration layer 114 can receive the encoded data ED from the ring buffer 125. The open media acceleration layer 114 can transmit the encoded data ED to the system framework 113. The system framework 113 can transmit the encoded data ED to the decoder circuit 115. The decoder circuit 115 can decode the encoded data ED to generate decoded data DD.

In some embodiments, a display device can display video corresponding to the decoded data DD. In some other embodiments, the decoded data DD can be stored in one storage unit.

In some related approaches, video data generated by a camera is duplicated to a buffer of an open media acceleration layer. Then, the video data is duplicated from the buffer of an open media acceleration layer to a shared memory in a video processor circuit. In other words, the video data are duplicated in the system processor circuit many times. However, multiple duplications increase the workload of the system processor circuit. In particular, the data amount of the video data without encoding is very large. When the resolution of the video is higher, the workload of the system processor circuit is larger. This causes the operating system run by the system processor to operate slowly, or even to crash.

Compared to the aforementioned related approaches, in the present disclosure, the system processor circuit 110 can extract the data parameter P associated with the video data VD, and can transmit the data parameter P to the video processor circuit 120. Then, the video processor circuit 120 can receive (duplicate) the video data VD from the graphic buffer 112 according to the data parameter P for subsequent encoding operation. Accordingly, there is no need to duplicate the video data VD many times in the system processor circuit 110. Thus, the workload of the system processor circuit 110 can be reduced such that the operating system run by the system processor circuit 110 can operate smoothly.

In addition, the video processor circuit 120 is mainly implemented by hardware. Accordingly, compared to the aforementioned approaches that utilize software (the system framework 113, the open media acceleration layer 114) for data duplication, the video processor circuit 120 implemented by hardware has a faster data duplication speed. Thus, efficiency of processing the video data VD in the present disclosure can be enhanced.

Further, in the present disclosure, there is no need to reduce the resolution or frame rate of the video data VD, and there is no need to turn off other applications run by the system processor circuit 110.

Figure 2:
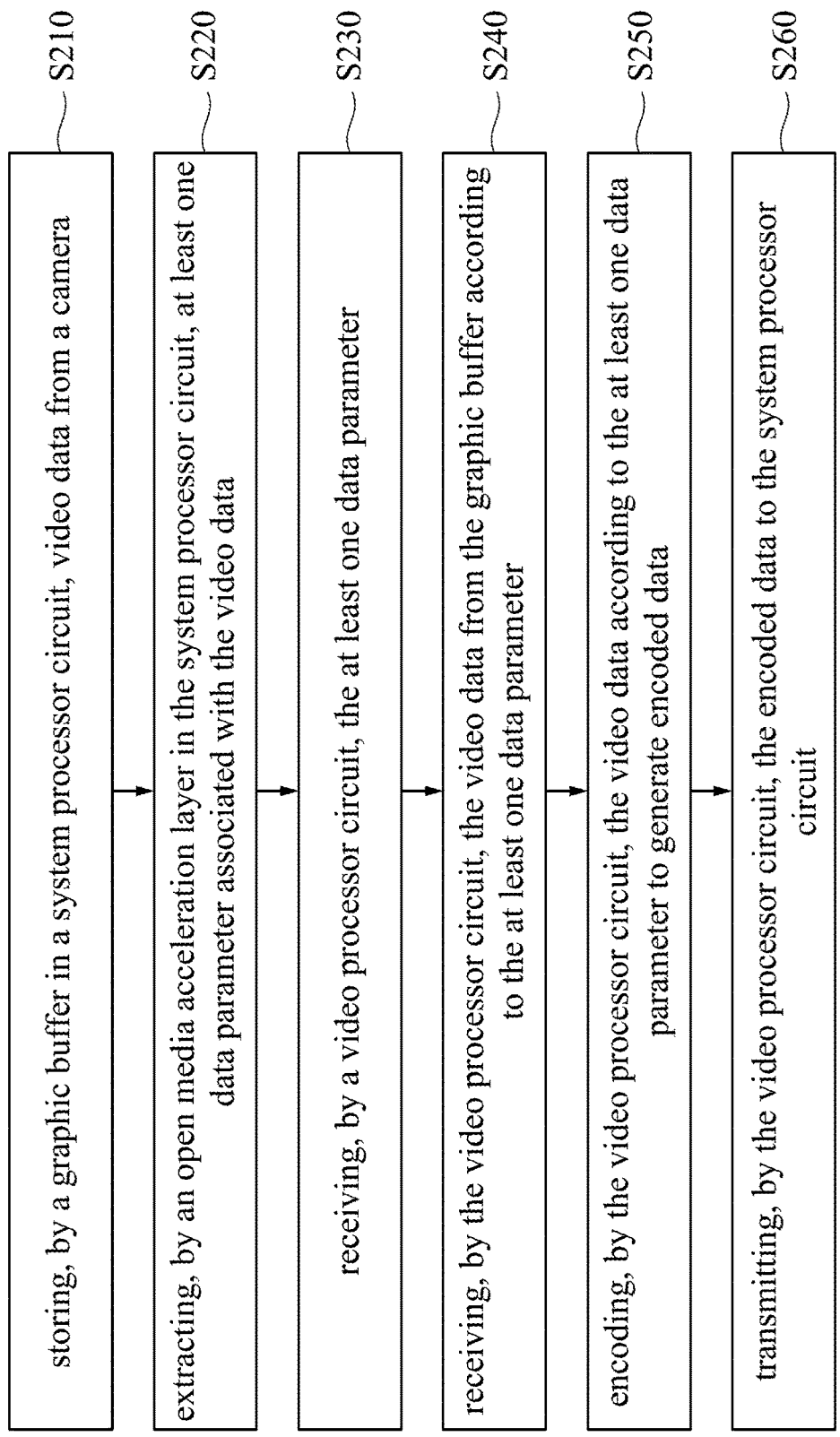
FIG. 2 is a flow diagram of a video processing method according to some embodiments of the present disclosure.

Reference is made to FIG. 2. FIG. 2 is a flow diagram of a video processing method 200 according to some embodiments of the present disclosure. As illustrated in FIG. 2, the video processing method 200 includes operations S210, S220, S230, S240, S250, and S260. It should be understood that the order of the operations mentioned in this embodiment can be adjusted according to actual requirements. Except for those whose order is specially stated, all of others or some of others can be executed simultaneously.

In some embodiments, the video processing method 200 can be implemented to the video processing system 100 in FIG. 1, but the present disclosure is not limited thereto. For ease of understanding, following paragraphs are described with reference to the video processing system 100 in FIG. 1.

In operation S210, the graphic buffer 112 in the system processor circuit 110 stores the video data VD from the camera CM. In some embodiments, the camera CM can be disposed outside the SoC in the electronic device. In some embodiments, the camera CM can be integrated with the video processing system 100.

In operation S220, the open media acceleration layer 114 in the system processor circuit 110 extracts the data parameter P associated with to the video data VD. In some embodiments, the data parameter P includes at least one of the physical address of the video data VD in the graphic buffer 112, the data size of the video data VD, and the encoding format of the video data VD.

In operation S230, the video processor circuit 120 receives the data parameter P. In some embodiments, the data parameter P can be transmitted from the open media acceleration layer 114 to the ring buffer 121.

In operation S240, the video processor circuit 120 receives the video data VD from the graphic buffer 112 according to the data parameter P. In some embodiments, the read circuit 122 can read the video data VD from the graphic buffer 112 according to the aforementioned physical address and the aforementioned data size.

In operation S250, the video processor circuit 120 encodes the video data VD according to the data parameter P to generate the encoded data ED. In some embodiments, the encoder circuit 124 can encode the video data VD according to the encoding format (e.g., YUV or RGB) in the data parameter P to generate the encoded data ED.

In operation S260, the video processor circuit 120 transmits the encoded data ED to the system processor circuit 110. In some embodiments, the encoded data ED can be transmitted from the ring buffer 125 to the open media acceleration layer 114, and then transmitted to the decoder circuit 115 via the system framework 113.

As described above, in the present disclosure, the system processor circuit can extract the data parameter associated with the video data and transmit the data parameter to the video processor circuit. Then, the video processor circuit can receive the video data from the graphic buffer according to the data parameter. Accordingly, the system processor circuit does not need to duplicate the video data many times, so the workload of the system processor circuit can be reduced and the operating system run by the system processor circuit can operate smoothly.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A video processing system, comprising:
   a system processor circuit, comprising:
     a graphic buffer configured to store video data from a camera; and
     an open media acceleration layer configured to extract at least one data parameter associated with the video data, wherein the at least one data parameter comprises a physical address and a data size; and
   a video processor circuit configured to receive the at least one data parameter, wherein the video processor circuit comprises:
     a read circuit electrically connected to the graphic buffer and configured to read the video data in the graphic buffer according to the physical address and the data size,
   wherein the video processor circuit is configured to encode the video data according to the at least one data parameter to generate encoded data, and transmit the encoded data to the system processor circuit.

2. The video processing system of claim 1, wherein the video processor circuit comprises:
   a first ring buffer configured to receive the at least one data parameter.

3. The video processing system of claim 2, wherein the read circuit is configured to read the at least one data parameter received by the first ring buffer, and request a video processing buffer according to the at least one data parameter.

4. The video processing system of claim 3, wherein the read circuit is further configured to store the video data into the video processing buffer.

5. The video processing system of claim 1, wherein the video processor circuit further comprises:
   an encoder circuit, wherein the at least one data parameter comprises an encoding format, and the encoder circuit is configured to encode the video data according to the encoding format to generate the encoded data.

6. The video processing system of claim 5, wherein the video processor circuit further comprises:
   a second ring buffer configured to receive the encoded data, wherein the open media acceleration layer is configured to receive the encoded data.

7. The video processing system of claim 1, wherein the system processor circuit further comprises:
   a system framework configured to receive the encoded data from the video processor circuit.

8. The video processing system of claim 7, wherein the system processor circuit further comprises:
   a decoder circuit configured to decode the encoder data to generate decoded data, wherein the decoded data is for a display device to display.

9. The video processing system of claim 1, wherein the system processor circuit and the video processor circuit are disposed on a system on chip (SoC).

10. A video processing method, comprising:
    storing, by a graphic buffer in a system processor circuit, video data from a camera;

extracting, by an open media acceleration layer in the system processor circuit, at least one data parameter associated with the video data, wherein the at least one data parameter comprises a physical address and a data size;

receiving, by a video processor circuit, the at least one data parameter;

reading, by a read circuit electrically connected to the graphic buffer, the video data in the graphic buffer according to the physical address and the data size;

encoding, by the video processor circuit, the video data according to the at least one data parameter to generate encoded data; and transmitting, by the video processor circuit, the encoded data to the system processor circuit.

11. The video processing method of claim 10, further comprising:

receiving, by a first ring buffer in the video processor circuit, the at least one data parameter.

12. The video processing method of claim 11, further comprising:

reading, by the read circuit in the video processor circuit, the at least one data parameter received by the first ring buffer; and requesting, by the read circuit, a video processing buffer according to the at least one data parameter.

13. The video processing method of claim 12, further comprising:

storing, by the read circuit, the video data into the video processing buffer.

14. The video processing method of claim 10, wherein the at least one data parameter comprises an encoding format, wherein the video processing method further comprises:

encoding, by an encoder circuit in the video processor circuit, the video data according to the encoding format to generate the encoded data.

15. The video processing method of claim 14, further comprising:

receiving, by a second ring buffer in the video processor circuit, the encoded data; and receiving, by the open media acceleration layer, the encoded data.

16. The video processing method of claim 10, further comprising:

receiving, by a system framework in the system processor circuit, the encoded data from the video processor circuit.

17. The video processing method of claim 16, further comprising:

decoding, by a decoder circuit in the system processor circuit, the encoded data to generate decoded data, wherein the decoded data is for a display device to display.

18. The video processing method of claim 10, wherein the system processor circuit and the video processor circuit are disposed on a SoC.

* * * * *